United States Patent
Lee et al.

(10) Patent No.: US 9,514,506 B2
(45) Date of Patent: Dec. 6, 2016

(54) METHOD AND APPARATUS FOR TILE BASED RENDERING USING TILE-TO-TILE LOCALITY

(75) Inventors: Won Jong Lee, Seoul (KR); Seok Yoon Jung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 420 days.

(21) Appl. No.: 13/452,095

(22) Filed: Apr. 20, 2012

(65) Prior Publication Data

US 2012/0320069 A1  Dec. 20, 2012

(30) Foreign Application Priority Data

Jun. 17, 2011  (KR) .................. 10-2011-0059010

(51) Int. Cl.
*G06T 1/20* (2006.01)
*G06F 9/50* (2006.01)

(52) U.S. Cl.
CPC ............ *G06T 1/20* (2013.01); *G06F 9/505* (2013.01); *Y02B 60/142* (2013.01)

(58) Field of Classification Search
USPC ....................................................... 345/505
See application file for complete search history.

(56) References Cited

U.S. PATENT DOCUMENTS

| | | | | |
|---|---|---|---|---|
| 6,433,789 B1* | 8/2002 | Rosman | .......... | 345/582 |
| 2003/0225815 A1* | 12/2003 | Brenner et al. | .......... | 709/106 |
| 2006/0143384 A1* | 6/2006 | Hughes et al. | .......... | 711/130 |
| 2011/0298813 A1* | 12/2011 | Barringer et al. | .......... | 345/506 |
| 2012/0146708 A1* | 6/2012 | Naffziger et al. | .......... | 327/512 |

FOREIGN PATENT DOCUMENTS

| | | | |
|---|---|---|---|
| JP | 2000057370 | * | 7/1999 |
| JP | 2000-57370 | | 2/2000 |
| JP | 2009-238192 | | 10/2009 |
| KR | 10-2007-0026521 | | 3/2007 |
| KR | 10-2008-0085888 | | 9/2008 |
| KR | 10-2011-0022080 | | 3/2011 |

OTHER PUBLICATIONS

Tierney, Brian, et al. "Distributed parallel data storage systems: A scalable approach to high speed image servers." Proceedings of the second ACM international conference on Multimedia. ACM, 1994.*

* cited by examiner

*Primary Examiner* — Mark Zimmerman
*Assistant Examiner* — Vu Nguyen
(74) *Attorney, Agent, or Firm* — NSIP Law (57) ABSTRACT

Disclosed is a method and apparatus for performing tile-based rendering. A sequence of tiles to be processed may be determined based on a locality among the tiles. A tile dispatch unit selects a subsequent tile to be dispatched, based on the determined sequence. The tile dispatch unit may check whether an idle fragment processor exists among the plurality of fragment processors, and may dynamically dispatch the selected tile to an idle fragment processor

17 Claims, 6 Drawing Sheets

METHOD AND APPARATUS FOR TILE BASED RENDERING USING TILE-TO-TILE LOCALITY

CROSS-REFERENCE TO RELATED APPLICATIONS

This application claims the priority benefit of Korean Patent Application No. 10-2011-0059010, filed on Jun. 17, 2011, in the Korean Intellectual Property Office, the disclosure of which is incorporated herein by reference.

BACKGROUND

1. Field

The following description relates to a rendering method and apparatus, and particularly, to a tile-based rendering method and apparatus using a multi-core.

2. Description of the Related Art

Generally, an image rendering scheme is classified as an object-based rendering (OBR) scheme and a tile-based rendering (TBR) scheme.

Hardware for the OBR scheme may be readily designed, and the OBR scheme may perform intuitive processing. According to the OBR scheme, random access to a memory, for example, a dynamic random access memory (DRAM) may be induced for each pixel in a pixel pipeline end.

According to the TBR scheme, a screen area is divided into tiles. The tiles are rendered using a quick internal memory, and a rendered result is transferred to a memory.

Therefore, the OBR scheme may be at a disadvantage when compared to the TBR scheme, in terms of power consumption and memory consumption.

SUMMARY

The foregoing and/or other aspects are achieved by providing an image processing method of a graphic processing unit (GPU) including a plurality of fragment processors, the method including determining a sequence of a plurality of tiles based on a locality among the plurality of tiles, selecting a tile to be processed, based on the determined sequence, allocating the selected tile to an idle fragment processor among the plurality of fragment processors, and rendering, performed by the fragment processor to which the selected tile is allocated, with respect to the selected time.

The sequence may be determined based on a space filling curve or a Hilbert curve in a two-dimensional (2D) array of the plurality of tiles.

The rendering may be performed in parallel by the plurality of fragment processors.

The plurality of fragment processors may access, using a shared cache, data required for performing rendering with respect to allocated tiles, respectively.

The selected fragment processor may patch texture data of the selected tile using a block including a plurality of texels.

The foregoing and/or other aspects are achieved by providing an image processing apparatus, the apparatus including a plurality of fragment processors to perform rendering with respect to allocated tiles, respectively, and a tile dispatch unit to select a tile to be processed based on a sequence determined based on a locality among a plurality of tiles, and to allocate the selected tile to an idle processor fragment among the plurality of fragment processors.

The sequence may be determined based on a space filling curve or a Hilbert curve in a two-dimensional (2D) array of the plurality of tiles.

The plurality of fragment processors may perform rendering in parallel with respect to different tiles.

The image processing apparatus may further include a vertex processor to perform geometrical processing with respect to model data, and to generate tile data.

The image processing apparatus may further include a cache to provide data required for performing rendering with respect to the selected tile, and the plurality of fragment processors may share the cache.

The selected fragment processor may patch texture data of the selected tile using a block including a plurality of texels.

The foregoing and/or other aspects are achieved by providing a tile dispatch unit, including a tile selecting unit to determine a sequence of a plurality of tiles based on a locality among the plurality of tiles, and to select a subsequent tile to be processed, based on the sequence, a tile patch unit to allocate the selected tile to an idle fragment processor among a plurality of fragment processors, and a tile transmitting unit to transmit tile data of the selected tile to the fragment processor to which the selected tile is allocated.

The sequence may be determined based on a space filling curve or a Hilbert curve in a two-dimensional (2D) array of the plurality of tiles.

The tile dispatch unit may further include a processor state checking unit to check whether an idle fragment processor exists among the plurality of fragment processors.

The tile patch unit may patch, from an external memory, the tile data of the selected tile.

The tile selecting unit, the tile patch unit, and the tile transmitting unit may repeatedly perform the operations until each of the plurality of tiles is allocated to one of the plurality of fragment processors.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
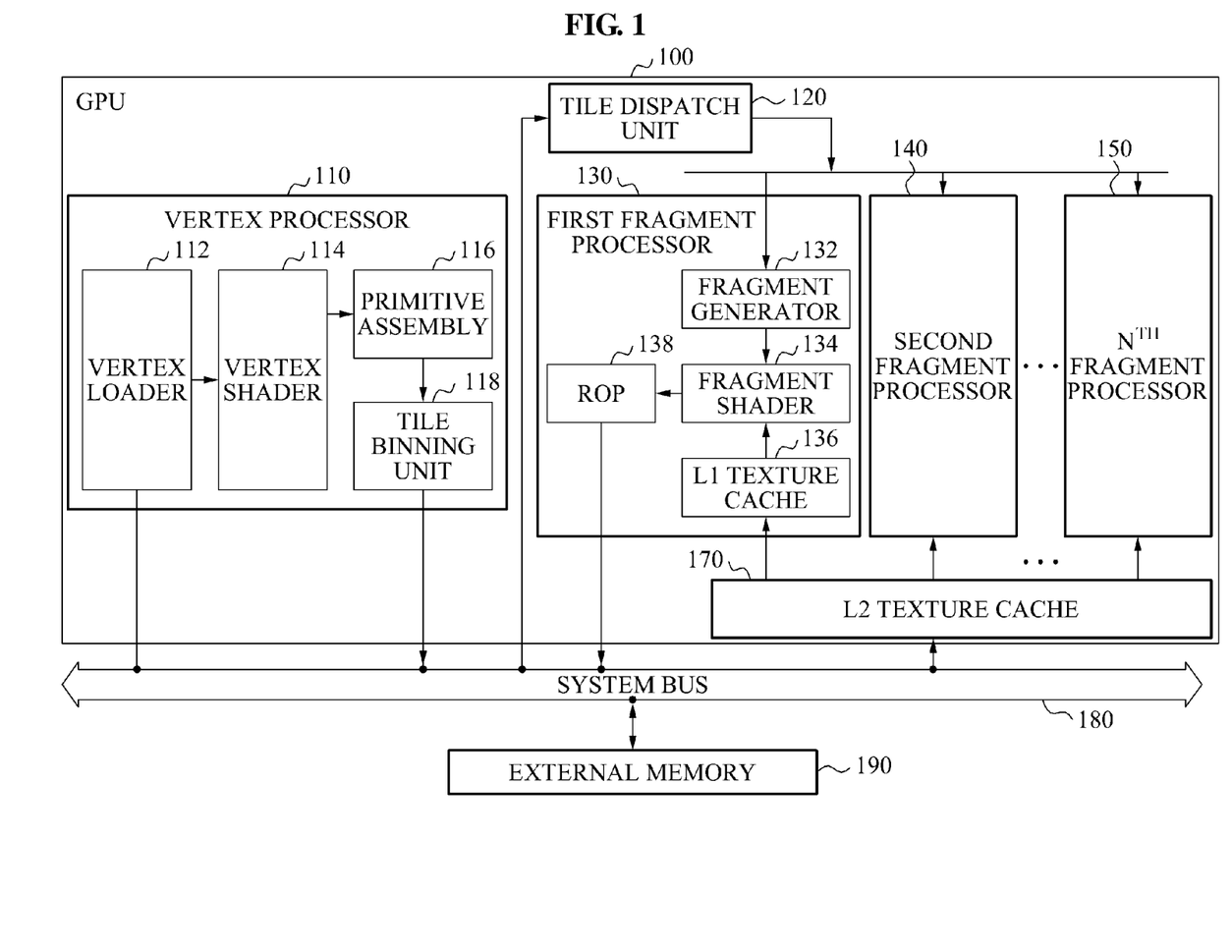
FIG. 1 illustrates a structure of an image processing apparatus according to example embodiments.

FIG. 1 illustrates a structure of an image processing apparatus according to example embodiments.

The image processing apparatus may include a graphic processing unit (GPU) 100, a system bus 180, and an external memory 190. The GPU 100 may process a graphic operation. The GPU 100 may be graphic hardware. The external memory 190 may provide, to the GPU 100, graphic data such as model data and the like, and may store graphic data processed by the GPU 100. The system bus 180 may be a data transfer bus between the GPU 100 and the external memory 190. The GPU 100 may read data from the external memory 190 and may write data in the external memory 190, through the system bus 180.

The GPU 100 may include a vertex processor 110, a tile dispatch unit (TDU) 120, and a level 2 (L2) texture cache 170. The GPU 100 may include a plurality of fragment processors, for example, a first fragment processor 130, a second fragment processor 140, and an $n^{th}$ fragment processor 150.

The vertex processor 110 may load model data, and may perform geometrical processing with respect to the loaded model data. The vertex processor 110 may perform geometrical processing, and may generate tile data, that is, vertex data for each tile. The vertex processor 110 may store the generated tile data in the external memory 190.

The TDU 120 may dispatch a plurality of tiles constituting a screen area to the plurality of fragment processors. The TDU 120 may allocate a predetermined tile to one of the plurality of fragment processors, for example, the first fragment processor 130, the second fragment processor 140, and the $n^{th}$ fragment processor 150.

The TDU 120 may read geometrically processed tile data from the external memory 190, and may dispatch the read tile data to the plurality of fragment processors. The TDU 120 may allocate tile data to a fragment processor that is selected to process the tile data. The TDU 120 may select a tile to be processed based on a sequence that is determined based on a locality among the plurality of tiles, and may allocate the selected tile to an idle processor among the plurality of fragment processors. The TDU 120 will be described, in detail, in the description with reference to FIG. 5.

The plurality of fragment processors, for example, the first fragment processor 130, the second fragment processor 140, and the $n^{th}$ fragment processor 150, may perform rendering with respect to allocated tiles, respectively. The plurality of fragment processors may perform rendering in parallel with respect to different tiles.

The plurality of fragment processors may correspond to graphic cores, respectively. Therefore, the GPU 100 or the image processing apparatus may represent a multi-core based parallel tile-rendering system. The plurality of fragment processors may process, in parallel, tile data allocated by the TDU 120. The plurality of fragment processors may perform rendering with respect to the allocated tiles, respectively.

The L2 texture cache 170 may provide data, for example, texture data, required by a fragment processor for performing rendering with respect to an allocated tile. The plurality of fragment processors, for example, the first fragment processor 130, the second fragment processor 140, and the $n^{th}$ fragment processor 150, may share the L2 texture cache 170. The L2 texture cache 170 may enable the plurality of fragment processors to share data required for performing rendering with respect to tiles.

When a fragment processor accesses predetermined texture data stored in the external memory 190, the predetermined texture data accessed by the fragment processor may be stored in the L2 texture cache 170. Subsequently, the stored predetermined texture data may be used by another fragment processor.

The vertex processor 110 may include a vertex loader 112, a vertex shader 114, a primitive assembly 116, and a tile binning unit 118.

The vertex loader 112 may read model data so as to process the read data in the GPU 100. The vertex shader 114 may perform geometrical processing with respect to the model data. The primitive assembly 116 may combine vertexes generated from the geometrical processing to a primitive type so as to generate a primitive, for example, a triangle. The tile binning unit 118 may perform tile binning with respect to the generated primitive so as to generate tile data, and may store the generated tile data in the external memory 190.

Each fragment processor may include a fragment generator 132, a fragment shader 134, a level 1 (L1) texture cache 136, and a raster operator (ROP) 138. For example, the first fragment processor 130 includes a fragment generator 132, a fragment shader 134, a L1 texture cache 136, and a raster operator (ROP) 138.

The fragment generator 132 may generate fragments inside the primitive.

The fragment shader 134 may perform texturing and coloring with respect to the generated fragments. The fragment shader 134 may perform texture mapping with respect to the generated fragments using texture data so as to provide a texture effect to an inside of the primitive. The fragment shader 134 may read, from the external memory 190, texture data required for the texture mapping. The fragment shader 134 may be provided with texture data through the L2 texture cache 170.

The L1 texture cache 136 may store texture data. Each fragment processor may include a corresponding texture cache, so as to access texture data. For example, the L1 texture cache 136 may be used by the first fragment processor 130, unlike the L2 texture cache 170 which is used by the plurality of fragment processors.

The ROP 138 may write textured fragments in a frame buffer.

Figure 2:
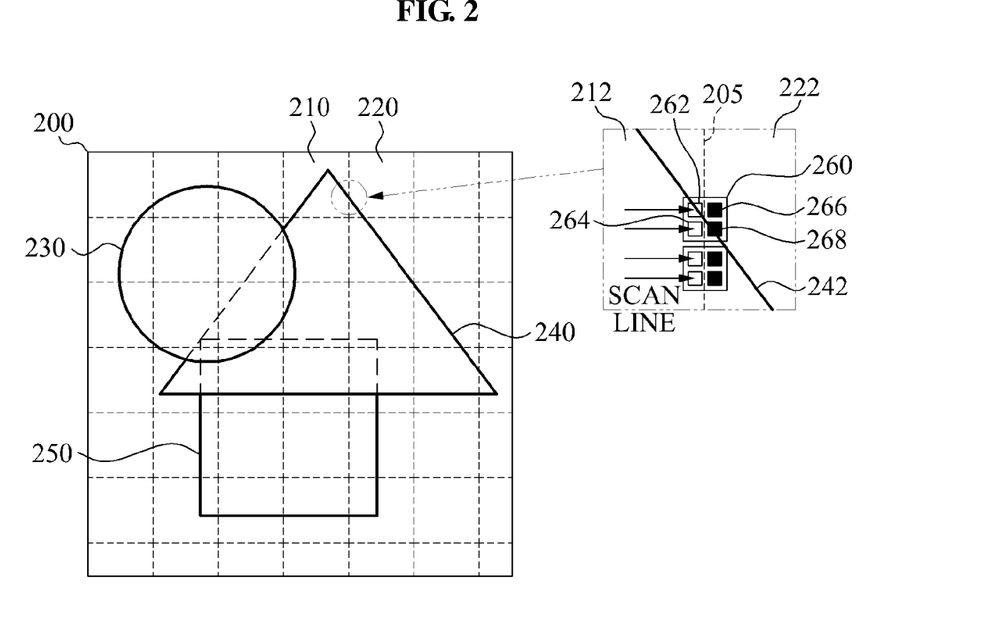
FIG. 2 illustrates an edge effect according to example embodiments.

FIG. 2 illustrates an edge effect according to example embodiments.

According to a tile-based rendering (TBR) scheme a screen area 200, that is, a frame, is divided into a plurality of tiles. In FIG. 2, tiles in a configuration of 7 rows×7 columns form the screen area 200. In the screen area 200, three objects, that is, a first object 230, a second object 240, and a third object 250, are included.

A continuity of a fragment may be lost at a silhouette edge of an object, or at an edge of a parallel task, that is, an edge of a tile. As an area of an edge increases, utilization of a cache that utilizes a reusability of data may decrease. Here, the decrease in the utilization may negatively affect a performance of a system.

In FIG. 2, a portion 212 of a first tile 210 and a portion 222 of a second tile 220 are enlarged. An edge 205 exists between the first tile 210 and the second tile 220 which are represented by a portion 212 and a portion 222, respectively. A portion 242 of the second object 240 may be included in the portion 212 and the portion 222.

A fragment shader or a fragment processor, for example, the first fragment processor 130, the second fragment processor 140, and the third fragment processor 150, may perform rendering with respect to the first tile 210. The fragment shader or the fragment processor may perform rendering with respect to a triangle included in the tiles, that is, the second object 240, along with a scan line. The fragment shader or the fragment processor may request data, for example, texture data, from the external memory 190, when processing a fragment of the edge 205.

The requested data may be stored in the L2 texture cache 170 and a corresponding L1 texture cache, so that the data may be reused afterward. The requested data may be provided based on a block unit. A block 260 may include a plurality of texels. The block 260 may include four texels 262, 264, 266, and 268.

Among the texels 262, 264, 266, and 268 included in the block 260, the texels 266 and 268 included in the second tile 220 that is adjacent to the first tile 210 may not be used in performing rendering with respect to the first tile 210.

When the block 260 is included in both the first tile 210 to which the rendering is performed and the second tile 220 adjacent to the first tile 210, data associated with a fragment included in the second tile 220, for example, the texels 266 and 268, may not be used by a fragment processor that performs rendering with respect to the first tile 210.

As an amount of data associated with a boundary area increases, an effect of an L1 texture cache may decrease due to a boundary effect, and a relatively wide texture bandwidth may be generated when compared to an object-based rendering (OBR) scheme and thus, may negatively affect a total performance of the system.

When data of the block 260 is used by a predetermined fragment processor, the data of the block 260 may be stored in the L2 texture cache 170. When another fragment processor uses the block 260 before the data of the block 260 is removed from the L2 texture cache 170, the other fragment processor may use the data of the block 260 from the L2 texture cache 170 without accessing the external memory 190.

When rendering with respect to the first tile 210 using the block 260 and rendering with respect to the second tile 220 using the block 260 are performed in parallel or are performed at a short time interval, the data of the block 260 may move from the external memory 190 to the L2 texture cache 170 just once. Accordingly, the efficiency of the L2 texture cache 170 increases and the total performance of the system may increase.

Accordingly, the total performance of the system may be improved when adjacent tiles are processed by fragment processors in parallel or at short time intervals. Therefore, a sequence for dispatching tiles to the fragment processors may need to be determined based on a locality among tiles.

Figure 3:
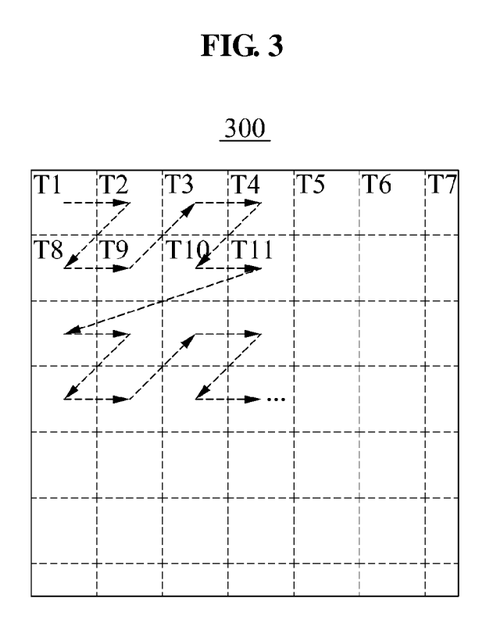
FIG. 3 illustrates dynamic coherent tile dispatch according to example embodiments.

FIG. 3 illustrates a dynamic coherent tile dispatch scheme in which fragment processors process a plurality of tiles 300 according to example embodiments.

Hereinafter, a static tile dispatch and a dynamic tile dispatch of a parallel TBR scheme will be described.

The static tile dispatch is a dispatch scheme in which fragment processors process a plurality of tiles are statically determined. Throughout the specification, a first tile, a second tile, a third tile, a fourth tile, a fifth tile, a sixth tile, a seventh tile, an eighth tile, a ninth tile, a tenth tile, and an eleventh tile are referred to as T1, T2, T3, T4, T5, T6, T7, T8, T9, T10, and T11, respectively. For example, when four fragment processors exit, a first fragment processor processes T1, T5, T9, and the like, and a second fragment processor processes T2, T6, T1, and the like.

A sequence for dispatching tiles may be determined based on a pattern to be used for improving a locality, for example, a space filing curve or a Hilbert curve. The tiles may be dispatched to fragment processors, based on the sequence determined based on the pattern to be used for improving the locality. For example, when the tiles are dispatched in an order of T1, T2, T8, T9, T3, T4, T10 and T11, a first fragment processor processes T1 and T3, the second fragment processor processes T2 and T4, a third fragment processor processes T8 and T10, and a fourth fragment processor processes T9 and T11. The static tile dispatch may increase a tile-to-tile locality, so that a performance of the L2 texture cache 170 may be improved and a latency of a fragment shader may decrease.

Generally, rendering is processed by the fragment processor and thus, a required time may be different for each tile. Therefore, when a fragment processor to process a predetermined tile is statically determined, a fragment processor that completes rendering with respect to all allocated tiles may be in an idle state.

For example, when a time required for processing T2 and T4 is relatively short, the second fragment processor may complete processing T2 and T4 and may be in an idle state while other fragment processors are still processing allocated tiles. Therefore, the static tile dispatch may have a low utilization of a fragment processor and a low load balancing, and may negatively affect a performance of a system.

The dynamic tile dispatch is a dispatch scheme in which tiles are sequentially dispatched to fragment processors and a subsequent tile is transmitted to an idle fragment processor. For example, each of T1 through T4 is dispatched to one of the four fragment processors, and T5 that is a subsequent tile may be dispatched to a fragment processor that completes processing first among the four fragment processors.

The dynamic tile dispatch may reduce an idle time of fragment processors and thus, may increase a utilization of the fragment processors and a load balancing among the fragment processors. The dynamic tile dispatch may reduce a locality and thus, may decrease the performance of the L2 texture cache 170 and may increase latency of a fragment shader. For example, when T8 is dispatched to an idle fragment processor while remaining processors processes T5, T6, and T7, respectively, a locality between T8 and other tiles, that is, T5, T6, and T7, is significantly low. Therefore, when the fragment processor processes T8, the performance of the L2 texture cache 170 may be significantly low.

Hereinafter, the dynamic coherent tile dispatch will be described.

According to the dynamic coherent tile dispatch, a sequence for processing a plurality of tiles, that is, a dispatch pattern, may be determined based on a locality among the plurality of tiles. The sequence may be determined based on a space filling curve or Hilbert curve in a two-dimensional (2D) array of the plurality of tiles.

Here, fragment processors to process the respective tiles may be dynamically determined.

A subsequent tile may be allocated to a fragment processor that completes processing with respect to an allocated tile and is in an idle state. For example, when the dispatch pattern has an order of T1, T2, T8, T9, T3, T4, T10, and T11, each of T1, T2, T8, and T9 may be dispatched to one of the four fragment processors. Subsequently, T3, a subsequent tile, may be dispatched to a fragment processor that completes processing with respect to an allocated tile and reaches an idle state first among the four fragment processors. Also, T4 that is a tile subsequent to T3 may be dispatched to a subsequent fragment processor that reaches an idle state. In this example, the fragment processor to which T3 is dispatched is also able to be the subsequent fragment processor.

A scheme of allocating a tile to an idle fragment processor is referred to as a dynamic dispatch. A scheme of allocating a subsequent tile based on a predetermined pattern is referred to as a coherent dispatch.

Figure 4:
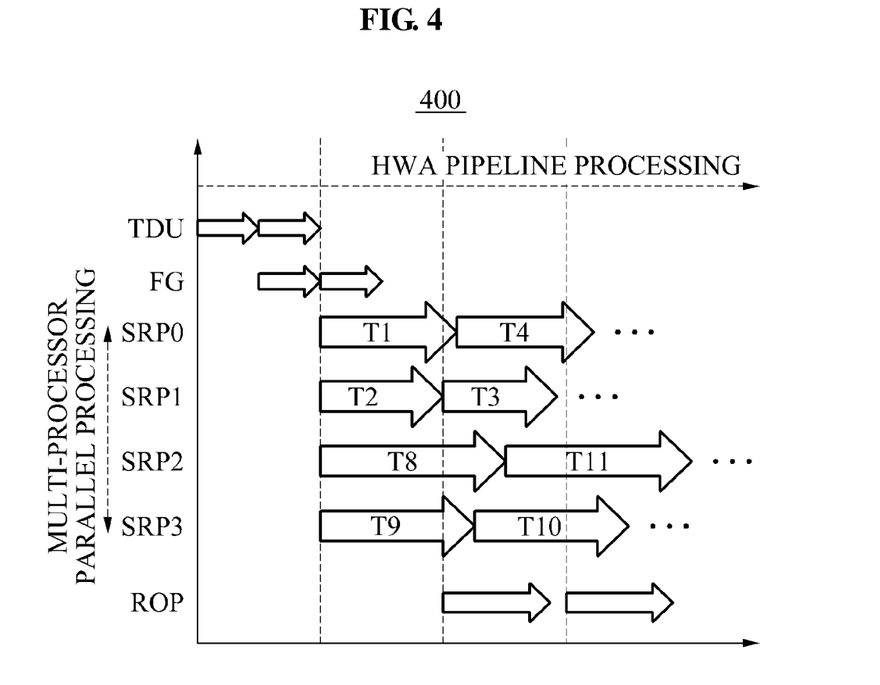
FIG. 4 illustrates an example of dynamic coherent tile dispatch according to example embodiments.

FIG. 4 illustrates an example of dynamic coherent tile dispatch according to example embodiments.

Referring to FIG. 4, a horizontal axis may show hardware accelerated (HWA) pipeline processing. Here, a vertical axis may show subjects that perform processing. "TDU" in a graph 400 may show an operation of a TDU. "FG" in the graph 400 may show an operation of a fragment generator. "SRP0" through "SPR3" in the graph 400 may show operations of fragment shaders, respectively. Here, SRP0 through SPR3 may denote four scene rendering processors, respectively. SRP0 through SRP3 arranged in the vertical direction may show parallel processing of a multi-processor using a plurality of fragment shaders. "ROP" in the graph 400 may show an operation of an ROP.

When the TDU dispatches tiles, a fragment generator generates a fragment and a fragment shader performs texturing and the like with respect to the fragment. According to a dynamic coherent tile dispatch, the tiles may be dispatched in an order of T1, T2, T8, T9, T3, T4, T10, and T11.

First, T1 may be dispatched to SRP0, for example, a first fragment processor or a corresponding fragment shader of the first fragment processor. T2 may be dispatched to SRP1, for example, a second fragment processor or a corresponding fragment shader of the second fragment processor. T8 may be dispatched to SRP2, for example, a third fragment processor or a corresponding fragment shader of the third fragment processor. T9 may be dispatched to SRP3, for example, a fourth fragment processor or a corresponding fragment shader of the fourth fragment processor.

Here, processing with respect to T2 is completed first among the four tiles. Therefore, T3, a subsequent tile, may be dispatched to SRP1 that completes the processing with respect to T2. T3 has a relatively high locality with T1, T2, T8, and T9. Therefore, when SRP1 processes T3, a utilization of an L2 texture cache may be high and an idle tile of SRP1 may be minimized.

Subsequently, T4 may be dispatched to SRP0 that completes processing with respect to T1. Subsequently, T1 may be dispatched to SRP3 that completes processing with respect to T9. Subsequently, T11 may be dispatched to SRP2 that completes processing with respect to T8.

A tile dispatched to a fragment processor may have a relatively high locality with a tile that is previously processed by the fragment processor and with tiles that are processed by other fragment processors in parallel. Therefore, the dynamic coherent tile dispatch may provide a tile-to-tile locality.

The dynamic coherent tile dispatch may improve the utilization of fragment processors. The fragment shaders having a relatively short latency may operate based on load balancing. The dynamic coherent tile dispatch may improve the utilization of the L2 texture cache and thus, may mitigate an increase in a texture bandwidth that is a drawback of an OBR scheme. Therefore, the dynamic coherent tile dispatch may have a relatively short ROP bandwidth and have a similar level of a texture bandwidth, when compared to the OBR scheme.

Figure 5:
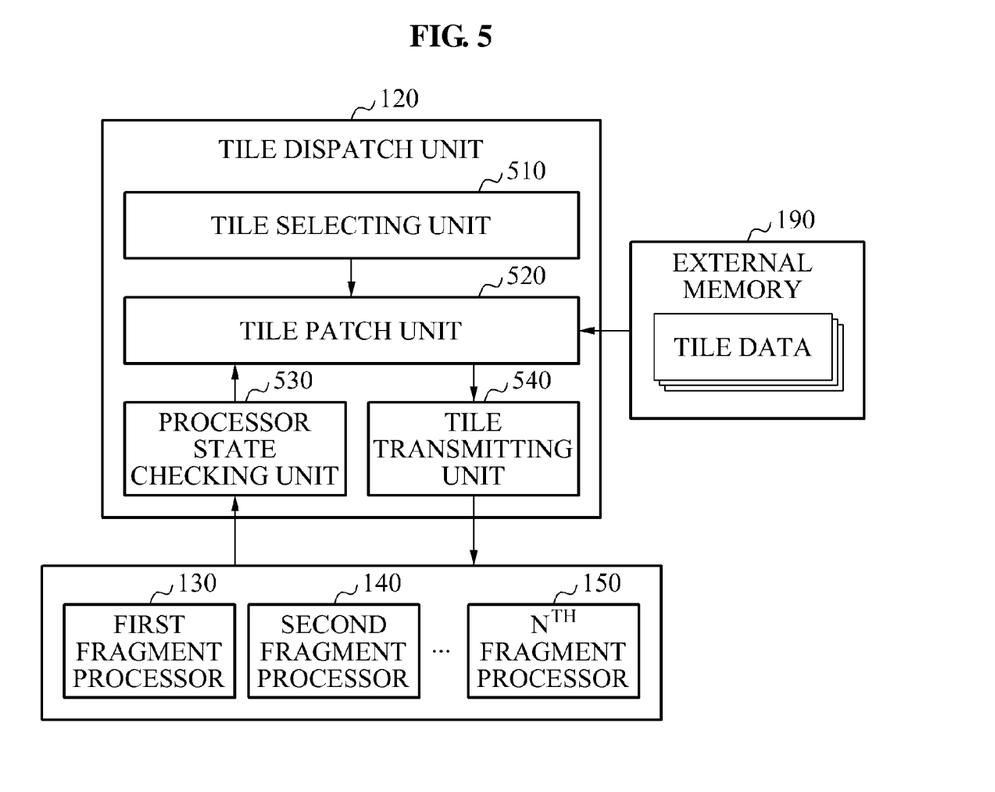
FIG. 5 illustrates a structure of a tile dispatch unit (TDU) according to example embodiments.

FIG. 5 illustrates a structure of the TDU 120 according to example embodiments.

Referring to FIG. 5, the TDU 120 may include a tile selecting unit 510, a tile patch unit 520, a processor state checking unit 530, and a tile transmitting unit 540.

The tile selecting unit 510 may determine a sequence of a plurality of tiles based on a locality among the plurality of tiles. The sequence may be determined based on a space filling curve or a Hilbert curve in a two-dimensional (2D) array of the plurality of tiles. The tile selecting unit 510 may select a subsequent tile to be processed, based on the determined sequence. The tile selecting unit 510 may calculate, based on a predetermined pattern, coordinates of the subsequent tile to be transmitted. Here, the subsequent tile to be transmitted may be a subsequent tile that is to be dispatched or allocated, and the predetermined pattern may include the sequence of the plurality of tiles. For example, when the subsequent tile is T3 based on the predetermined pattern, the tile selecting unit 510 may calculate the coordinates of T3, for example, a row and a column of T3.

The processor state checking unit 530 may check whether an idle fragment processor exists among a plurality of fragment processors, for example, the first fragment processor 130, the second fragment processor 140, and the $n^{th}$ fragment processor 150.

The tile patch unit 520 may allocate the selected tile, that is, the subsequent tile to be processed, to an idle fragment processor. When a plurality of idle fragment processors exists, one of the plurality of idle fragment processors may be selected by the tile patch unit 520 or the processor state checking unit 530, as a fragment processor to which the selected tile is to be allocated. The plurality of idle fragment processors may be fragment processors that complete processing with respect to allocated tiles and are in an idle state, among the plurality of fragment processors.

The tile patch unit 520 may allocate the selected tile, that is, the subsequent tile to be processed, to the selected fragment processor. The tile patch unit 520 may patch, from the external memory 190, tile data of the selected tile.

The tile transmitting unit 540 may transmit the tile data of the selected tile to the selected fragment processor. The fragment processor that receives the tile data may perform rendering with respect to the selected tile.

The tile selecting unit 510, the tile patch unit 520, the processor state checking unit 530, and the tile transmitting unit 540 may repeatedly perform the operations until each of the plurality of tiles is dispatched to one of the plurality of fragment processors.

Example embodiments described with reference to FIGS. 1 through 4 are applicable to the present example embodiment and thus, detailed descriptions thereof will be omitted for conciseness.

Figure 6:
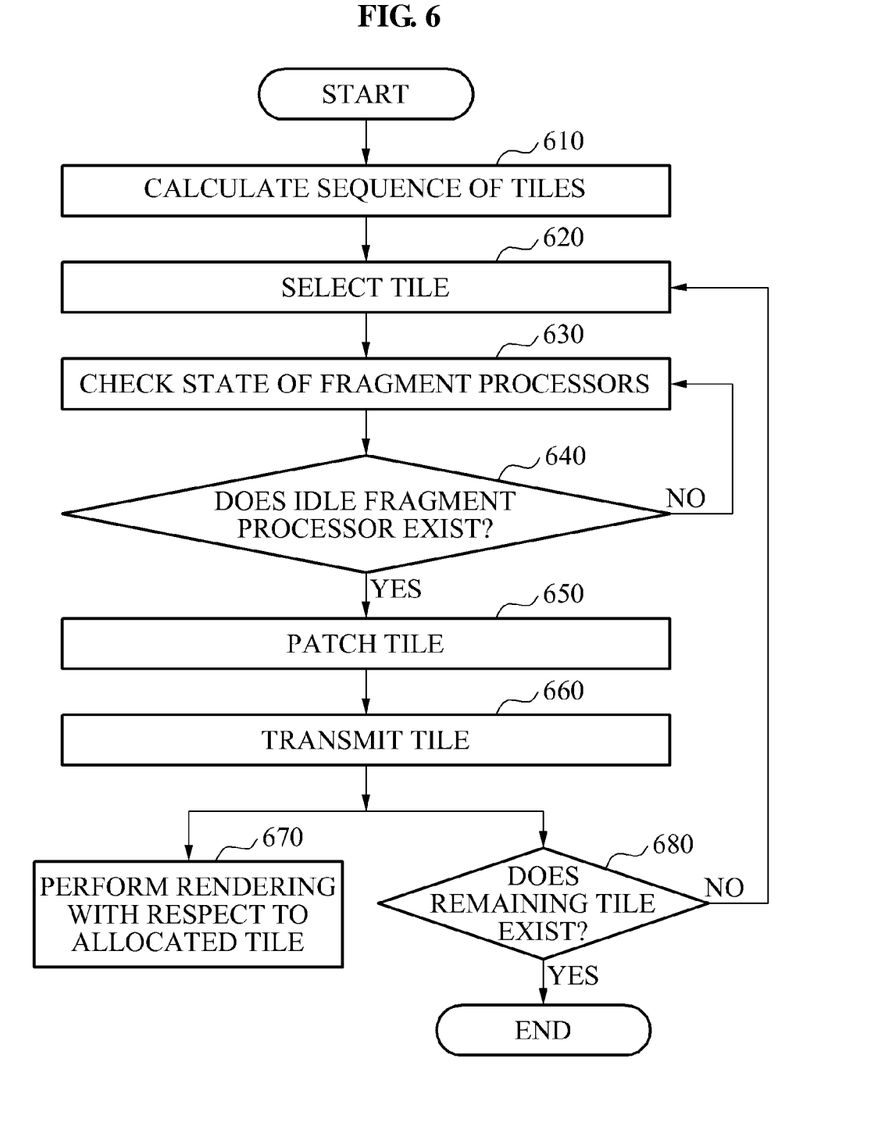
FIG. 6 illustrates an image processing method according to example embodiments.

FIG. 6 illustrates an image processing method according to example embodiments.

In operation 610, a sequence of a plurality of tiles may be determined, by, for example, a tile selecting unit 510, based on a locality among the plurality of tiles.

In operation 620, a subsequent tile to be processed may be selected, by, for example, the tile selecting unit 510, based on the determined sequence.

In operation 630, a plurality of fragment processors, for example, the first fragment processor 130, the second fragment processor 140, and the $n^{th}$ fragment processor 150, may be checked by, for example, the processor state checking unit 530. Whether the plurality of fragment processors is in an idle state may be checked, respectively.

In operation 640, whether an idle fragment processor exists may be determined by, for example, the processor state checking unit 530 or the tile patch unit 520. When the idle fragment processor is absent, the image processing method may proceed with operation 630 again. In this example, operation 630 may be delayed for a predetermined time before being performed again. When the idle fragment processor exists, image processing method may proceed with operation 650.

In operation 650, the selected tile may be allocated to the idle fragment by, for example, the tile patch unit 520. When a plurality of idle fragment processors exists, one of the plurality of idle fragment processors may be selected in operation 650 or operation 630, as a fragment processor to which the selected tile is to be allocated. In operation 650, tile data of the selected tile may be patched from the external memory 190 by, for example, the tile patch unit 520.

In operation 660, the tile data may be transmitted by, for example, the tile transmitting unit 540, to the fragment processor to which the selected tile is allocated.

In operation 670, the fragment processor to which the selected tile is allocated may perform rendering with respect to the selected tile. In this example, operation 670 may be performed, in parallel, by the plurality of fragment processors. The plurality of fragment processors may access, through shared L2 texture cache 170, data required for rendering corresponding allocated tiles, respectively. The selected fragment processor may patch texture data of the selected tile, using a block including a plurality of texels.

In operation 680, whether a remaining tile exists may be checked by, for example, the tile selecting unit 510 or the tile dispatch unit 520. When the remaining tile is absent, the image processing method is terminated, and when the remaining tile exists, the image processing method may proceed with operation 620.

Example embodiments described with reference to FIGS. 1 through 5 are applicable to the present example embodiment and thus, detailed descriptions thereof will be omitted for conciseness.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing method of a graphic processing unit (GPU) including a plurality of fragment processors, the method comprising:
   reading geometrically processed tile data from an external memory disposed outside of the GPU, and connected to the GPU via a system bus;
   determining a sequence of a plurality of tiles to be processed by at least one of the plurality of fragment processors, based on a locality of each tile among the plurality of tiles;
   selecting a tile to be processed, based on the determined sequence;
   checking a plurality of fragment processors inside the GPU, in response to determining any fragment processor being in an idle state,
   wherein the checking continues in response to a fragment processor being determined not to be in an idle state, and
   wherein the checking is delayed for a predetermined time before being performed again in response to the fragment processor being determined to be in the idle state;
   allocating the tile to be processed to an idle fragment processor among the plurality of fragment processors, based on the determined sequence; and
   rendering, by the fragment processor to which the tile is allocated, the allocated tile, wherein each of the plurality of fragment processors is configured to perform rendering of a tile by using a respective internal cache, and wherein each of the plurality of fragment processors is configured to access, by using a shared cache, data for performing rendering with respect to allocated tiles.

2. The method of claim 1, wherein the determining of the sequence is based on a space filling curve or a Hilbert curve, in a two-dimensional (2D) array of the plurality of tiles.

3. The method of claim 1, wherein the rendering is performed in parallel by the plurality of fragment processors.

4. The method of claim 1, wherein the fragment processor is configured to patch texture data of the allocated tile, by using a block including a plurality of texels.

5. A non-transitory computer-readable medium comprising a program for instructing a computer to perform the method of claim 1.

6. The method of claim 1, wherein predetermined texture data is capable of being utilized by the fragment processors in response to being stored in the shared cache.

7. An image processing apparatus, the apparatus comprising:
   a vertex processor configured to perform geometrical processing with respect to model data, to generate tile data, and to store the generated tile data in an external memory connected to the image processing apparatus via a system bus;
   a plurality of fragment processors configured to perform rendering with respect to a plurality of tiles, each fragment processor including an internal cache disposed in the fragment processor and configured to store texture data;
   a tile dispatcher configured to allocate a tile among the plurality of tiles to an idle fragment processor among the plurality of fragment processors, based on a sequence of the plurality of tiles to be processed by at least one of the plurality of fragment processors, wherein the sequence is determined according to a locality among the plurality of tiles, wherein the tile dispatcher comprises:
  a processor state checking unit configured to check whether or not an idle fragment processor exists among the plurality of fragment processors,
  wherein the checking continues in response to a fragment processor being determined not to be in an idle state, and
  wherein the checking is delayed for a predetermined time before being performed again in response to the fragment processor being determined to be in the idle state; and
  an external cache disposed outside of all of the fragment processors, but inside the image processing apparatus, and configured to provide data required for performing rendering with respect to the allocated tile, wherein the external cache is configured to be shared by the plurality of fragment processors.

8. The apparatus of claim 7, wherein the sequence is determined based on a space filling curve or a Hilbert curve, in a two-dimensional (2D) array of the plurality of tiles.

9. The apparatus of claim 7, wherein the plurality of fragment processors performs rendering in parallel with respect to different tiles.

10. The apparatus of claim 7,
  wherein each fragment processor is configured to read data required for performing rendering, from at least one of: the internal cache, the external cache, and memory external to the image processing apparatus.

11. The apparatus of claim 7, wherein the fragment processor is configured to patch texture data of the allocated tile, by using a block including a plurality of texels.

12. The apparatus of claim 7, wherein the tile dispatcher comprises:
  a tile selector configured to determine the sequence of the plurality of tiles to be processed by the at least one of the plurality of fragment processors based on the locality among the plurality of tiles;
  a tile patcher configured to allocate the tile among the plurality of tiles to the idle fragment processor among the plurality of fragment processors based on the sequence; and
  a tile transmitter configured to transmit tile data of the allocated tile to the fragment processor to which the tile is allocated.

13. The tile dispatcher of claim 12, wherein the tile selector is configured to determine the sequence based on a space filling curve or a Hilbert curve, in a two-dimensional (2D) array of the plurality of tiles.

14. The tile dispatcher of claim 12, wherein the tile patcher is configured to patch, from an external memory, the tile data of the allocated tile.

15. The tile dispatcher of claim 12, wherein the tile selector, the tile patcher, and the tile transmitter are configured to repeatedly perform the operations until each of the plurality of tiles is allocated to one of the plurality of fragment processors.

16. The tile dispatcher of claim 12, wherein the locality among the plurality of tiles comprises a set of coordinates for each of the plurality of tiles, and wherein the set of coordinates comprises a row location and a column location.

17. The tile dispatcher of claim 7, wherein when the processor state checking unit determines that no fragment processor is idle, the processor state checking unit is configured to perform a delay operation, and then to re-check whether or not an idle fragment processor exists among the plurality of fragment processors.

* * * * *